(12) United States Patent
Kauth et al.

(10) Patent No.: US 7,071,284 B2
(45) Date of Patent: Jul. 4, 2006

(54) PROCESS FOR THE PREPARATION OF POLYCARBONATES

(75) Inventors: Hermann Kauth, Krefeld (DE); Christian Kords, Krefeld (DE); Jürgen Heuser, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/751,621

(22) Filed: Jan. 5, 2004

(65) Prior Publication Data
US 2004/0158026 A1 Aug. 12, 2004

(30) Foreign Application Priority Data
Jan. 10, 2003 (DE) ................................ 103 00 598

(51) Int. Cl.
*C08G 64/00* (2006.01)
(52) U.S. Cl. .................... 528/196; 73/40.7; 528/176.1; 528/219; 528/198
(58) Field of Classification Search ............. 264/176.1, 264/219; 528/196, 198; 73/40.7
See application file for complete search history.

(56) References Cited

U.S. PATENT DOCUMENTS

| 4,558,118 | A | * | 12/1985 | Sikdar ........................ 528/196 |
| 5,235,026 | A | * | 8/1993 | Wulff et al. ................. 528/196 |
| 6,613,868 | B1 | | 9/2003 | Kauth et al. ................. 528/196 |
| 2002/0151672 | A1 | | 10/2002 | Kauth et al. ................. 528/196 |

FOREIGN PATENT DOCUMENTS

| GB | 1118146 | 6/1968 |
| GB | 42 27 372 | 4/1993 |

* cited by examiner

*Primary Examiner*—Terressa Boykin
(74) *Attorney, Agent, or Firm*—Joseph C. Gil; Aron Preis

(57) ABSTRACT

An improvement in the continuous two-phase interfacial condensation process for preparing polycarbonate is disclosed. In the process that entails at least one diphenol, phosgene, at least one chain terminator, and optionally branching agents and is carried out in the presence of a catalyst the improvement comprising maintaining the concentration of the catalyst at a level of at least 0.012 mol per mol of diphenol.

4 Claims, 1 Drawing Sheet

PROCESS FOR THE PREPARATION OF POLYCARBONATES

FIELD OF THE INVENTION

The present invention is directed to a process for the continuous preparation of polycarbonates and more particularly to the two-phase interface process.

SUMMARY OF THE INVENTION

An improvement in the continuous two-phase interfacial condensation process for preparing polycarbonate is disclosed. In the process that entails at least one diphenol, phosgene, at least one chain terminator, and optionally branching agents and is carried out in the presence of a catalyst the improvement comprising maintaining the concentration of the catalyst at a level of at least 0.012 mol per mol of diphenol to get in polycarbonate with a low content of nitrogen.

BACKGROUND OF THE INVENTION

The two-phase interface process has proved itself for many years in the preparation of polycarbonates. The process renders possible the preparation of thermoplastic polycarbonates for a number of fields of use, such as e.g. data carriers (CD, DVD), optical or medical uses.

Polycarbonates may in principle be prepared by the two-phase interface process or the melt process.

By the two-phase interface process, they may be prepared completely continuously, as is described e.g. in EP-A 1 249 463.

In continuous process variants by the interface process it has been found in particular that the polycarbonates prepared contain a small amount of nitrogen which has been incorporated into the polycarbonate.

However, the properties of the polycarbonate, in particular the properties which are important for use in the field of data carriers, are adversely influenced by this incorporated nitrogen.

Polycarbonates prepared by a discontinuous process are conventionally free from nitrogen, but continuous variants are frequently desired for cost reasons.

Polycarbonates prepared by the melt process are conventionally also free from nitrogen, but these materials have other disadvantages, such as e.g. a high content of monomers, monocarbonates, oligomers and branched structures.

There was therefore the object of providing a completely continuous two-phase interface process in which the content of incorporated, bonded nitrogen is between 20 and 3 ppm.

DE-A 42 27 372 and EP-A 1 249 463 of the Applicant, in which the apparatus arrangement of the process according to the invention is already described, are presently relevant art. However, no doctrine at all or only an indication that the nitrogen content is critical or of how this would be counteracted is to be found in the prior art.

DETAILED DESCRIPTION OF THE INVENTION

Figure 1:
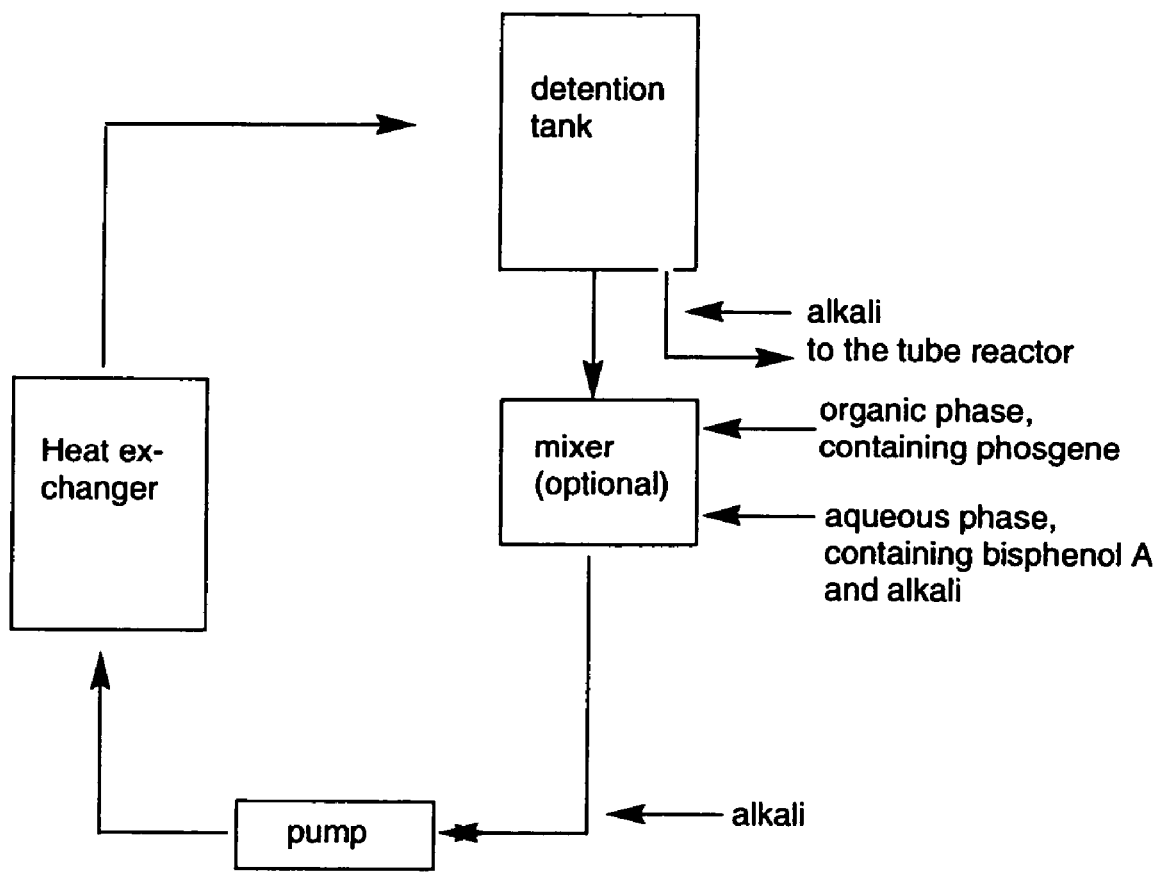
FIG. 1 is a schematic representation of a circulating pump reactor.

It has now been found, surprisingly, that polycarbonate is obtained continuously in a very good product quality—measured by the content of incorporated nitrogen—if the metered amount of catalyst is not allowed to fall below a minimum amount of 0.012, up to 0.05 mol of catalyst per mol of bisphenol employed.

Particularly good results are achieved if this catalyst metering is used in combination with the reactor arrangement of "loop reactor" —comprising a heat exchanger with a circulating pump loop and residence tank—plus residence tubes.

This is particularly surprising since to reduce the nitrogen content the expert would attempt to decrease the amount of the nitrogen source, namely the catalyst. A maximum and not a minimum value would therefore be expected as the limit value.

The present invention provides a process for the continuous preparation of polycarbonates which contain small amounts of bonded nitrogen by the method of the continuous two-phase interface process from diphenols, phosgene, chain terminators, catalyst and optionally branching agents in a mixture of aqueous-alkaline phase and organic solvent phase, characterized in that the metered amount of catalyst is not allowed to fall below a minimum amount of 0.012, up to 0.05 mol of catalyst per mol of bisphenol employed.

This process preferably comprises the following process steps:

1. Continuous bringing together of the organic phase and the aqueous phase in the loop reactor, during which an emulsion forms, optionally using a mixer, wherein the organic phase is a solvent which is suitable for the polycarbonate and already contains the phosgene and the aqueous phase comprises water and a mixture of alkali metal hydroxide solution and phenolic components (bisphenol and optionally monophenol as a chain terminator),
   wherein
2. a temperature of less than 60° C., preferably 55° C.–25° C. is established in the loop reactor, the loop reactor provides an average dwell time of at least 2 minutes, preferably between 2 and 15 minutes, and a part amount of the emulsion formed is removed continuously from the loop reactor via the residence tank, and
3. the part amount of the emulsion thus removed is then pumped through tube reactors which are equipped with mixing and residence zones and provide a total dwell time of between 2 minutes and 40 minutes, preferably 2–30 minutes,
   wherein
   1) the ratio (expressed in moles/mole) of metered amount of phosgene to the amount of phosgene theoretically necessary to react all the bisphenol and phenol is between 1.12 and 1.22, preferably between 1.13 and 1.20,
   2) Phosgene solution and bisphenol solution are metered into the circulating loop downstream from the residence tank and upstream from the pump, optionally through a mixer; the chain terminator may also be introduced into the circulating pump loop or in the alternative directly into the tube reactors, see 5 below),
   3) within the loop reactor alkali metal hydroxide solution is further added on the suction side of the pump in an amount of 15–40%, preferably 20–35% of the total amount to be further added, 4) within the circulating pump reactor bisphenol A and phosgene solutions are metered into the loop reactor according to 2) such that the part amount removed at the residence tank corresponds to the total amount of solutions metered in, 5) further alkali metal hydroxide solution (85–60%, preferably 80–65% of the total alkali metal hydroxide solution to be further added according to 3) and 5)) and optionally chain terminator are added into the part amount removed from the residence tank, directly before introduction into the tube reactor, and 6) after a further 1–20 minutes, preferably 1–15 minutes dwell time in the tube reactor, the catalyst is added in a ratio of at least 0.012, preferably 0.012 up to 0.5 particularly preferably 0.012 up to 0.04 and very particularly preferably 0.012 up to 0.03 mol of catalyst per mol of bisphenol employed.

"after" and "before" in the present connection are always to be understood in the flow direction of the emulsion within the circulating pump reactor.

A loop reactor comprises here a circulating loop, a pump for pumping the reaction emulsion in circulation, metering points, optionally designed as mixers, for the organic phase (solvent containing phosgene) and aqueous phase (alkali metal hydroxide solution and diphenol component), a heat exchanger and a residence tank, which is equipped in parallel with a removal possibility for continuous removal of a part stream.

A tube reactor here consists of mixing and residence tubes and is connected downstream after the removal point of the residence tank of the circulating pump reactor.

A preferred embodiment of the process according to the invention is obtained by adhering to the metering rates and circulating pump conditions described in EP-A 1 249 463, p. 4,1. 1–25.

Surprisingly, a polycarbonate with a nitrogen content, measured in accordance with ASTM D 4629 and DIN 51444 (determination of nitrogen by the Antek method), of between 3 and 20 ppm is obtained by employing the process according to the invention.

Suitable diphenols are those of the formula HO—Z—OH, in which Z is an aromatic radical having 6 to 45 C atoms, which may contain one or more aromatic nuclei, may be substituted and may contain aliphatic radicals or cycloaliphatic radicals or heteroatoms as bridge members.

Examples are
dihydroxydiphenyls,
bis-(hydroxyphenyl)-alkanes
bis-(hydroxyphenyl)-cycloalkanes
bis-(hydroxyphenyl) sulfides
bis-(hydroxyphenyl) ethers and nucleus-alkylated and nucleus-halogenated compounds thereof These and further suitable other diphenols are described e.g. in U.S. Pat. Nos. 3,028,365, 4,982,014, 2,999,835, 3,148,172, 3,275,601, 2,991,273, 3,271,367, 3,062,781, 2,970,131 and 2,999,846, in DE-A 15 70 703, 20 63 050, 20 63 052 and 22 11 956, French Patent Specification 1 561 518 and in DE-A 38 33 953.

Preferred diphenols are:
2,2-bis-(4-hydroxyphenyl)-propane (bisphenol A) and 1,1-bis-(4-hydroxyphenyl)-3,3,5-trimethyl-cyclohexane (TMC-bisphenol).

It is to emphasized here that the process according to the invention may be employed practically for all known diphenols.

The diphenols are employed in the process according to the invention in aqueous-alkaline solution, the concentration of diphenols here being 10–20%, preferably 12.5 to 17.5%, and the amount of alkali 1.0 to 3.0 mol of alkali metal hydroxide solution per mol of bisphenol, depending on the solubility of the bisphenol employed.

The phosgene is employed in organic solvents in a concentration of 7–10%, preferably 8–9.5%.

Suitable chain terminators and branching agents are known from the literature. Some are described, for example, in DE-A 38 33 953. Preferred chain terminators are phenol, cumylphenol, isooctylphenol and para-tert-butylphenol. The chain terminators may be metered in the pure form or in various concentrations as a solution in organic solvents.

Preferred branching agents are trisphenols and tetraphenols, as well as 3,3-bis-(3-methyl-4-hydroxyphenyl)-2-oxo-2,3-dihydroindole. The branching agents may also be metered in the pure form or in various concentrations as a solution in organic solvents.

Sodium hydroxide solution or potassium hydroxide solution are employed as the alkali metal hydroxide solution, and alkaline earth metal hydroxide solutions may optionally also be employed. Aqueous sodium hydroxide solution is preferred. The concentration of the NaOH in the aqueous sodium hydroxide solution corresponds to that of the commercially obtainable alkalis, that is to say is between 20 and 60%, preferably between 30 and 50%, and sodium hydroxide solution which is obtained directly from the amalgam or membrane process, ideally the membrane process of chloralkali electrolysis with concentrations of 50 or 32% respectively, is very particularly preferred.

All the percentage data in the present context are to be understood as wt. %, unless explicitly stated otherwise.

Suitable catalysts are include all the catalysts known for the preparation of polycarbonates by the two-phase interface process, such as e.g. tertiary amines. N-Ethyl-piperidine and triethylamine are preferred.

The organic phase contains solvent or a solvent mixture which dissolves polycarbonate. Suitable solvents are all the known solvents which are capable of dissolving polycarbonate to the extent of at least 5 wt. % at temperatures of about 20° C., and mixtures thereof.

Methylene chloride, toluene and monochlorobenzene are preferred, and methylene chloride and mixtures of methylene chloride and monochlorobenzene in a ratio of 20:80 parts by wt. to 75:25 parts by wt. are particularly preferred.

A pH of between 9 and 14, preferably between 9.5 and 13.0, is established over the entire reaction. This is effected by employing the necessary amount of alkali metal hydroxide solution to dissolve the diphenols once at the start, and moreover carrying out a first topping up of the alkali metal hydroxide solution before the heat exchanger, and then carrying out a second topping up of the alkali metal hydroxide solution, optionally together with the chain terminator, before the tube reactors.

The polycarbonates may be processed to any desired shaped articles in a known manner, it being possible to add the conventional additives for thermoplastic polycarbonates, such as stabilizers, mold release agents or flameproofing agents, fillers or glass fibers, before or during the processing.

The polycarbonates obtainable by the process according to the invention may be employed industrially in a known manner as any desired shaped articles or also as sheets and films, for example in the automobile sector or in optical uses, in particular also in optical and magneto-optical storage media.

The following uses may be mentioned by way of example but without being limiting:

1. Safety panes, which as is known are necessary in many areas of buildings, vehicles and aircraft, and as shields of helmets.
2. Production of foils, in particular ski foils.
3. Production of blow moldings (see, for example, U.S. Pat. No. 2,964,794), for example 1 to 5 gallon water bottles.
4. Production of light-transmitting sheets, in particular hollow chamber sheets, for example for covering buildings such as railway stations, greenhouses and lighting installations.
5. Production of optical data stores.
6. For production of traffic light housings or traffic signs.
7. For production of foams (see, for example, DE-B 1 031 507).
8. For production of threads and wires (see, for example, DE-B 1 137 167 and DE-A 1 785 137).
9. As translucent plastics with a content of glass fibres for lighting purposes (see, for example, DE-A 1 554 020).
10. As translucent plastics with a content of barium sulfate, titanium dioxide and/or zirconium oxide or organic polymeric acrylate rubbers (EP-A 634 445, EP-A 269 324) for the production of light-transmitting and light-scattering moldings.
11. For production of precision injection moldings, such as, for example, lens holders. Polycarbonates with a content of glass fibres which optionally additionally contain about 1–10 wt. % $MoS_2$, based on the total weight, are used for this.
12. For production of optical apparatus components, in particular lenses for photographic and film cameras (see, for example, DE-A 2 701 173).
13. As light transmission carriers, in particular as light conductor cables (see, for example, EP-A1 0 089 801).
14. As electrical insulating materials for electrical conductors and for plug housings and plug connectors.
15. Production of mobile telephone housings with improved resistance to perfume, shaving lotion and skin perspiration.
16. Network interface devices.
17. As a carrier material for organic photoconductors.
18. For production of lamps, e.g. searchlight lamps, as so-called "headlamps", diffuser panes or internal lenses.
19. For medical uses, e.g. oxygenators, dialysers.
20. For foodstuffs uses, such as e.g. bottles, utensils and chocolate molds.
21. For uses in the automobile sector where contact with fuels and lubricants may occur, such as, for example, bumpers, optionally in the form of suitable blends with ABS or suitable rubbers.
22. For sports articles, such as e.g. slalom poles or ski shoe buckles.
23. For household articles, such as e.g. kitchen sinks and letter-box housings.
24. For housings, such as e.g. electrical distribution cabinets.
25. Housings for electric toothbrushes and hairdryer housings.
26. Transparent washing machine portholes with improved resistance to the wash solution.
27. Safety glasses, optical correction glasses.
28. Lamp covers for kitchen equipment with improved resistance to kitchen vapour, in particular oil vapours.
29. Packaging films for medicaments.
30. Chip boxes and chip carriers.
31. For other uses, such as e.g. feed stable doors or animal cages.

The following examples are intended to illustrate the present invention, but without limiting it.

EXAMPLES

Example 1

Via a T-piece, before the pump, 24,000 kg/h of an alkaline bisphenol A solution which contains 15 wt. % BPA and 2.1 mol of sodium hydroxide solution per mol of BPA and, via a further T-piece, 1,840 kg/h of phosgene dissolved in 21,000 kg/h of solvent, which consists of 50 wt. % methylene chloride and 50 wt. % monochlorobenzene, are metered into a loop reactor.

To maintain the alkalinity, 348 kg/h of 32% sodium hydroxide solution are metered in and the reaction mixture is passed back to the pump via the heat exchanger and the residence tank, the above substance streams being metered in.

The temperature is 38° C.

A part amount of the emulsion which is as high as that of the raw materials flowing in is fed before the metering points for BPA and phosgene from the residence tank to a further pump and pumped through a tube reactor. 1,064 kg/h of sodium hydroxide solution (32 wt. %) and 703 kg/h of a solution (20 wt. %) of p-tert-butylphenol, dissolved in the solvent mixture (50 parts methylene chloride and 50 parts monochlorobenzene), are metered into this stream. After a dwell time of 10 min, 29 kg/h of N-ethylpiperidine (0.0163 mol per mol of bisphenol A) in the form of a 5.2% solution in the solvent mixture (50 parts methylene chloride and 50 parts monochlorobenzene) are metered in and the emulsion is pumped through a further tube reactor by means of a further pump.

After a dwell time of a further 10 min, the emulsion is separated in a separating vessel and the polycarbonate solution is washed free from electrolytes by known processes, e.g. by the centrifuge technique.

The polycarbonate solution is concentrated in evaporation units and freed from residual solvent on a devolatilization extruder.

The following analytical data are determined on the polycarbonate granules:

YI=1.33*
Eta rel=1.196**
Phenol. OH=90 ppm***
Nitrogen=8 ppm****

* measured in accordance with ASTM E 313
** measured in accordance with ISO 1628/4
*** measured by UV spectroscopy at 546 nm after a colour reaction of the phenol end groups with $TiCl_4$
**** measured in accordance with ASTM D 4629 and DIN 51444 (determination of nitrogen by the Antek method).

Example 2

Via a T-piece, before the pump, 27,000 kg/h of an alkaline bisphenol A solution which contains 15 wt. % BPA and 2.1 mol of sodium hydroxide solution per mol of BPA and, via a further T-piece, 2,090 kg/h of phosgene dissolved in 22,950 kg/h of solvent, which consists of 50 wt. % methylene chloride and 50 wt. % monochlorobenzene, are metered into a loop reactor.

To maintain the alkalinity, 445 kg/h of 32% sodium hydroxide solution are metered in and the reaction mixture is passed back to the pump via the heat exchanger and the residence tank, the above substance streams being metered in. The temperature is 38° C.

A part amount of the emulsion which is as high as that of the raw materials flowing in is fed before the metering points for BPA and phosgene from the residence tank to a further pump and pumped through a tube reactor. 1,135 kg/h of sodium hydroxide solution (32 wt. %) and 740 kg/h of a solution (20 wt. %) of p-tert-butylphenol, dissolved in the solvent mixture (50 parts methylene chloride and 50 parts monochlorobenzene), are metered into this stream. After a dwell time of 9 min, 36 kg/h of N-ethylpiperidine (0.0179 mol per mol of bisphenol A) in the form of a 6.1% solution in the solvent mixture (50 parts methylene chloride and 50 parts monochlorobenzene) are metered in and the emulsion is pumped through a further tube reactor by means of a further pump.

After a dwell time of 9 min, the emulsion is separated in a separating vessel and the polycarbonate solution is washed free from electrolytes by known processes, e.g. by the centrifuge technique.

The polycarbonate solution is concentrated in evaporation units and freed from residual solvent on a devolatilization extruder.

The following analytical data are determined on the polycarbonate granules:
YI=1.32
Eta rel=1.193
Phenol. OH=70 ppm
Nitrogen=5 ppm Example 3

Via a T-piece, before the pump, 35,000 kg/h of an alkaline bisphenol A solution which contains 15 wt. % BPA and 2.1 mol of sodium hydroxide solution per mol of BPA and, via a further T-piece, 2,700 kg/h of phosgene dissolved in 31,500 kg/h of solvent, which consists of 50 wt. % methylene chloride and 50 wt. % monochlorobenzene, are metered into a loop reactor.

To maintain the alkalinity, 525 kg/h of 32% sodium hydroxide solution are metered in and the reaction mixture is passed back to the pump via the heat exchanger and the residence tank, the above substance streams being metered in.

The temperature is 38° C.

A part amount of the emulsion which is as high as that of the raw materials flowing in is fed before the metering points for BPA and phosgene from the residence tank to a further pump and pumped through a tube reactor. 1,540 kg/h of sodium hydroxide solution (32 wt. %) and 966 kg/h of a solution (20 wt. %) of p-tert-butylphenol, dissolved in the solvent mixture, are metered into this stream.

After a dwell time of 7 min, 55 kg/h of N-ethylpiperidine (0.026 mol per mol of bisphenol A) in the form of a 5.1% solution in the solvent mixture (50 parts methylene chloride and 50 parts monochlorobenzene) are metered in and the emulsion is pumped through a further tube reactor by means of a further pump.

After a dwell time of 7 min, the emulsion is separated in a separating vessel and the polycarbonate solution is washed free from electrolytes by known processes, e.g. by the centrifuge technique.

The polycarbonate solution is concentrated in evaporation units and freed from residual solvent on a devolatilization extruder.

The following analytical data are determined on the polycarbonate granules:
YI=1.29
Eta rel=1.194
Phenol. OH=80 ppm
Nitrogen=3 ppm Comparison Example 1

The polycarbonate is prepared as described in EP-A 1 249 493 example 3. 28 kg/h of ethylpiperidine (0.0107 mol per mol of bisphenol A) are metered.

The following analytical data are determined on the polycarbonate granules:
YI=1.4
Eta rel=1.196
Phenol. OH=90 ppm
Nitrogen=30 ppm Comparison Example 2

As described in example 1, but the following amounts are metered:
31,000 kg/h of BPA solution, 2,460 kg/h of phosgene, 523 kg/h of NaOH 32% in the circulating pump loop and 1,320 kg/h of NaOH 32% after the circulating pump loop, 857 kg/h of butylphenol solution (20%) and 24 kg/h of N-ethylpiperidine (0.0104 mol per mol of bisphenol A) (4.8% solution).

The following analytical data are determined on the polycarbonate granules:
YI=1.45
Eta rel=1.193
Phenol. OH=70 ppm
Nitrogen=35 ppm Comparison Example 3

As described in example 1, but the following amounts are metered:
27,000 kg/h of BPA solution, 2,135 kg/h of phosgene, 416 kg/h of NaOH 32% in the circulating pump loop and 1,190 kg/h of NaOH 32% after the circulating pump loop, 740 kg/h of butylphenol solution (20%) and 21 kg/h of N-ethylpiperidine (0.0105 mol per mol of bisphenol A) (4.6% solution).

The following analytical data are determined on the polycarbonate granules:
YI=1.38
Eta rel=1.196
Phenol. OH=75 ppm
Nitrogen=42 ppm The experiments clearly demonstrate that, surprisingly, if the metering of catalyst falls below the minimum this leads to a higher content of nitrogen in the polycarbonate.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. In the continuous two-phase interfacial condensation process for preparing polycarbonate which contains 20 to 35 ppm of bonded nitrogen from at least one diphenol, phosgene, at least one chain terminator, and optionally branching agents and in the presence of a tertiary amine catalyst in a mixture of aqueous alkaline phase and organic solvent phase the improvement comprising maintaining the metered amount of the catalyst at a level not less than 0.012 and not more than 0.05 mol per mol of diphenol.

2. The process of claim 1 wherein the level is at least 0.05 mol per mole of diphenol.

3. The polycarbonate prepared by the process of claim 1.

4. A molded article comprising the polycarbonate of claim 3.

* * * * *